(No Model.) 2 Sheets—Sheet 1.

W. G. WALTER.
CASTER.

No. 318,403. Patented May 19, 1885.

WITNESSES:

INVENTOR
W. G. Walter

BY
ATTORNEYS (No Model.) 2 Sheets—Sheet 2.
W. G. WALTER.
CASTER.
No. 318,403. Patented May 19, 1885.
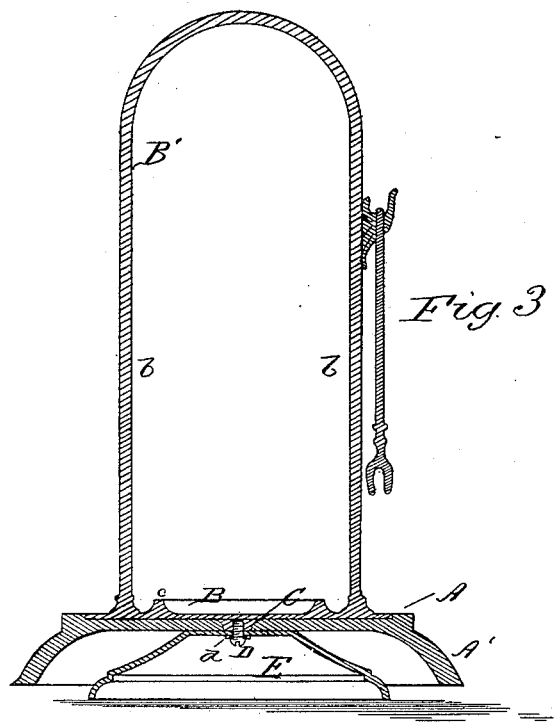
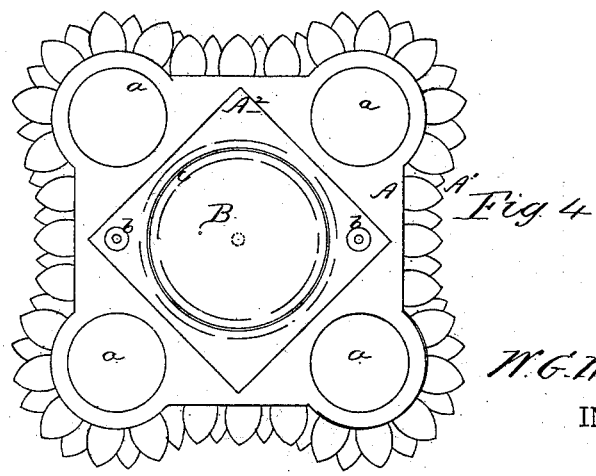

UNITED STATES PATENT OFFICE.

WILLIAM G. WALTER, OF PITTSBURG, PENNSYLVANIA.

CASTER.

SPECIFICATION forming part of Letters Patent No. 318,403, dated May 19, 1885.

Application filed September 30, 1884. (No model.)

*To all whom it may concern:*

Be it known that I, WILLIAM G. WALTER, of Pittsburg, in the county of Allegheny and State of Pennsylvania, have invented certain new and useful Improvements in Casters; and I do hereby declare that the following is a full, clear, and exact description of the invention, which will enable others skilled in the art to which it appertains to make and use the same, reference being had to the accompanying drawings, which form a part of this specification.

My invention has relation to casters for containing bottles, jars, &c., for the reception of the condiments usually furnished at the table. Heretofore these casters have usually been made wholly of metal, either of silver or of baser metals silver-plated; hence their cost has been considerable, and they have required constant and laborious cleaning and burnishing.

My invention has for its object the provision of a novel and unique caster made principally of glass, porcelain, or other similar vitreous material; and it consists in the novel construction, combination, and arrangement of parts hereinafter described and claimed.

Figure 1:
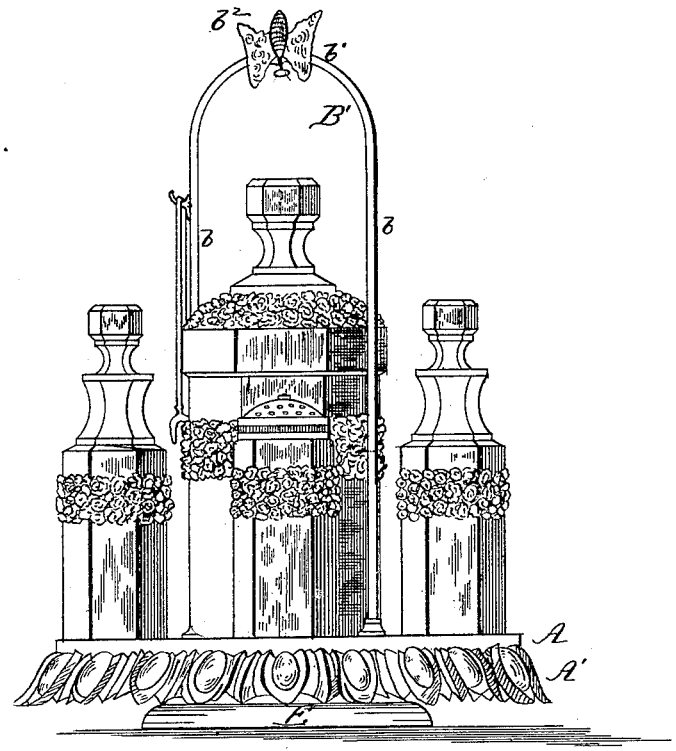
Figure 2:
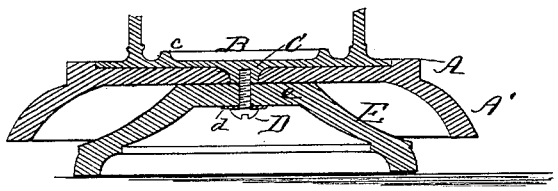

Referring to the accompanying drawings, Figure 1 is an elevation of the caster complete; Fig. 2, a section of the lower portion of the caster; Fig. 3, a vertical section showing a modified form of base; Fig. 4, a plan view of the base with the bottles removed.

A designates the revolving portion of the caster, upon which the bottles, &c., rest, and which may be called the "stand." This stand is made of glass, porcelain, delf, or any other similar material, and is cast or formed in a single piece. This stand may be of any desired shape in plan view, and is formed with a depending edge, A', on all sides, which edge reaches nearly to the surface on which the caster stands. The depending edge serves to receive the ornamentation or fanciful design, and also serves to conceal the joint between the stand and the base or foot upon which the stand rests and revolves.

The top of stand A is provided with depressions $a\ a\ a$, in which are set the cruets and bottles and pepper-pots. A cavity or depression, $A^2$, is also formed on top of the stand A, at its middle, for the reception of the plate to which the handle of the caster is secured. B designates the said plate, and B' the handle of the caster, composed of two legs, $b\ b$, and an arch, $b'$, to which is secured a suitable ornamental hand-piece, $b^2$. The legs and arch of the handle are of metal, as is the plate B, and the handle and plate are preferably cast in one piece.

At the center of the plate B, and on its lower side, is a nut, C, and on the top of said plate a flange, $c$, which serves to receive and retain in position a pickle-jar or other receptacle or utensil. The stand A has a hole in its center, in which the nut C fits, and the latter is screw-threaded to receive a screw, D, that serves to fasten and pivot the handle and stand upon the foot or base of the caster.

E designates the foot or base of the caster. Said foot consists of a single piece of material suitably designed or ornamented and dish-shaped in cross-section, its top $e$ being flat, so as to afford an even support for the stand A, and being provided with a hole for the passage of the screw D. This base I generally prefer to make of glass, porcelain, or other vitreous material, as shown in Figs. 1, 2; but it may be made of metal, if desired, as shown in Fig. 3. A washer, $d$, is inserted between the screw-head D and the bottom of base E.

It will be observed that I form the entire caster, with the exception of the handle and its bottom plate, wholly of glass or similar substance, and that I am thereby enabled to make the article at much less cost than where the same is wholly of metal.

The glass stand being held in position by a single screw screwing into the bottom of the handle, it is capable of being rotated, and as the screw does not pass into the glass, but through the same and into the bottom of the handle, the manufacture is rendered cheap and easy, and the caster is strongly and firmly secured together.

By the substitution of a glass stand for a metal or silver-plated one the cost of the stand is greatly reduced without detracting from its utility or the beauty of its appearance.

The glass stand may be formed with ornamental designs during the process of manufacturing the same, or it may be suitably ornamented by etching or cutting, or it may be silvered, if desired, after it has been molded.

I am aware that it is not new to construct a caster of vitreous material and to provide the same with a metallic handle. I am further aware that a caster has been made wherein the base is of glass, and a metallic handle has its lower end passed through the base and held in position by a nut screwing upon the end of the handle; hence I do not claim, broadly, a glass caster having a metallic handle.

Having described my invention, I claim—

1. A caster or bottle-holder consisting of a vitreous stand, a metallic handle, and a suitable foot or base, all secured together by a single screw or pivot passing through the base and stand and into the handle, substantially as described.

2. The combination of glass stand A, a metallic handle, a bottom plate, B, and nut C, with glass base E, and screw D, passing through said base and stand and into said plate, substantially as described.

In testimony that I claim the foregoing as my own I have hereto affixed my signature in presence of two witnesses.

WILLIAM G. WALTER.

Witnesses:
LOUIS MOESER,
ALVA A. MOORE.